United States Patent [19]

Saunders

[11] Patent Number: 5,193,912
[45] Date of Patent: Mar. 16, 1993

[54] PROBE FOR SENSING AND MEASURING TEMPERATURE

[76] Inventor: Roger I. Saunders, 92 Van Dyke Rd., P.O. Box 31, Hollis, N.H. 03049

[21] Appl. No.: 793,197

[22] Filed: Nov. 18, 1991

[51] Int. Cl.$^5$ .................... G01K 7/04; H01L 35/02
[52] U.S. Cl. ..................... 374/179; 136/232
[58] Field of Search .......... 374/179, 180, 208; 136/231, 232, 233

[56] References Cited

U.S. PATENT DOCUMENTS

| | | | |
|---|---|---|---|
| 2,136,055 | 11/1938 | Miller | 136/230 X |
| 2,798,893 | 7/1957 | Winkler | 136/231 |
| 3,398,580 | 8/1968 | Nyman et al. | 374/180 X |
| 3,407,097 | 10/1968 | Engelhard | 374/180 X |
| 3,539,400 | 11/1970 | Pustell | 374/208 X |
| 3,939,012 | 2/1976 | Williams | 374/181 X |
| 4,614,443 | 9/1986 | Hamert | 374/179 |
| 4,626,643 | 12/1986 | Minet | 374/149 |

Primary Examiner—Daniel M. Yasich
Attorney, Agent, or Firm—Robert G. Crooks

[57] ABSTRACT

This is a method and apparatus for removably mounting a thermocouple in intimate thermal contact with an electrical component or other object whose temperature is to be accurately sensed and measured. The apparatus comprises a probe having a miniaturized "gripper" or a spring-biased sensor for perceiving the temperature at a precisely defined point. Provision is made for shielding the thermocouple from ambient gases that might degrade the desired temperature perception. Various provisions are made for removably mounting the shielded thermocouple on or in contact with a circuit board or an independent structure.

17 Claims, 8 Drawing Sheets

PROBE FOR SENSING AND MEASURING TEMPERATURE

This invention relates to a thermocouple probe for sensing and facilitating the measurement of the temperatures of certain objects. In particular, the invention is concerned with the sensing and measurement of the temperatures of small objects such as electronic components mounted or in the process of being mounted on or removed from circuit boards. In accordance with the principles of the invention, the probe may be temporarily attached to, or at least exert a perceptible mechanical force on, the electronic component or other device or object whose temperature is to be sensed and measured. By causing the probe to exert a mechanical force on the component or other object, whether by temporary attachment or otherwise, the user of the probe is assured of obtaining good thermal contact between the probe and the component or other object. Further, the probe is constructed in such a way that its thermocouple senses the temperature of the component or other object rather than that of the ambient medium surrounding the probe. This feature is of special importance in processes such as reflow soldering, where the temperatures of electronic components on a circuit board must be accurately sensed and measured when the probe is operating in an oven wherein the environment is extremely hot air or other gas having a temperature which must not be confused with that of the electronic component or other object. Evidence of conception of this invention is contained in Disclosure Document 277,904, filed Apr. 1, 1991. It has been requested that said Disclosure Document be permanently retained by the United States Patent and Trademark Office.

BACKGROUND OF THE INVENTION

For many years, thermocouple junctions have been employed in the measurement of temperatures in industrial processes and in machines having constituent parts whose temperatures are important either because of their effect on other constituent parts or because of the permitted operating temperature range of the parts themselves. It will be understood that a thermocouple junction for measuring temperature comprises at least two dissimilar materials which are intimately connected together and which, by reason of their dissimilarity, generate a thermoelectric voltage that is a function of the temperature of the junction. Such thermocouple junctions are commercially available in very small sizes so that they may be employed in the measurement of temperatures of extremely small objects such as the pins or "legs" of semiconductor devices and of other "chips" and integrated circuits that may have a great many legs disposed very closely together around the edges of the chip. For instance, a microprocessor chip, such as those marketed by Intel, Motorola, and Texas Instruments, may have as many as 50 legs per inch around its periphery.

Although thermocouples are available in sub-miniature sizes having dimensions which are very small even when each delicate thermocouple junction is surrounded by a protective sheath, there has not until now been a satisfactory commercially-available means for temporarily holding the thermocouple junction or its sheath in intimate thermal contact with a device or other extremely small object whose temperature is to be sensed and measured. Furthermore, there has not been a satisfactory way to attach temporarily a probe containing a thermocouple Junction to a very small object whose temperature is to be sensed and measured, while permitting the probe to be easily released from the object without damaging or moving it.

In the "surface-mount" method of attaching electronic components to a circuit board, the components are carefully placed upon "pads" of solder paste that have been deposited on corresponding pads on the circuit board through a mask so as to constitute a "foundation" for the electronic components which are to be fastened to the board without having their pins or legs extend through holes in the board. Each electronic component is then precisely positioned on the board so that each of its legs rests in a pad of solder paste on the surface of the board. Until each pad of solder paste has been fused and in turn solidified, the electronic component is not so firmly adhered to the board that its position on the board is permanently fixed. In accordance with the practices of modern surface-mount technology, the pads of solder paste are fused by placing the board and its associated electronic components in a "reflow oven" filled with air or inert gas which is sufficiently hot to fuse the pads of solder paste. Upon leaving the oven, the temperature of the board and its associated components falls to a level such that the solder hardens, thereby retaining the components permanently fixed in place on the surface of the board.

During the reflow process, it is usually necessary to determine and maintain the temperatures of certain critical components. For instance, it is generally necessary that the temperature of the "coldest" component on the board be at least sufficient to ensure the prompt and thorough fusing of all the solder pads on which it is mounted. Moreover, it is vital that, during the soldering operation, the temperature of the "hottest" component not attain a level that would be harmful to the semiconductor material or to the proper distribution of the impurities therein, as set forth in the operating specifications promulgated by the manufacturer of the component. For these purposes, it may not be sufficient to sense and measure the temperature of the component as a whole, on the assumption that the temperature of the component is uniform or that there is no particular portion thereof which has a critical threshold temperature of damage that is different from the threshold temperature of damage in the remainder of the component. On the contrary, it is frequently necessary, or at least desirable, to be able to sense the temperature of a certain small portion of the component, for example a leg or pin connected to that portion. As aforementioned, there has not heretofore been a satisfactory commercially-available means for removably positioning a thermocouple junction in close thermal contact with a very small surface area of a component whose temperature is of particular importance.

Reference has been made to the reflow-soldering processes that are now widely employed in the surface mounting of electronic components on circuit boards. In the reflow processes, the circuit board with its associated components is passed through an oven containing extremely hot air or inert gas. Of course, the use of inert gas is favored in order to prevent oxidation of copper conductors in the circuit board or of the solder itself in such a way as to impair the electrical conductivity of a soldered joint.

Just as in the case of surface mounting of electronic components on a circuit board, the same concerns for temperature measurement with high resolution prevail if solder is to be removed from a circuit board for the re-arrangement of electronic components or substitution of new ones. In either case, the circuit board and the components to be mounted or removed and any necessary temperature-measuring means are likely to be immersed in very hot gas which may in some cases be in rapid motion. It remains important for the thermocouple probe and its junction of dissimilar materials to measure the temperature of a particular portion of a particular component, rather than that of the mass of ambient gas.

Finally, provision must be made for supporting the weight of the probe while it is in operation. Although the thermocouple junction itself may be very small in size and have a mass that is almost negligible, the structure for supporting the thermocouple junction and protecting it against its environment during temperature sensing and measurement may be quite substantial. In certain instances, it may be feasible for the object whose temperature is being sensed to support part of the weight of the thermocouple probe. In other instances, the weight of the thermocouple probe and its associated structure must be externally borne. For instance, if there is any possibility of deformation of the circuit board during the heating and cooling steps of the re-flow-soldering process, the probe and its thermocouple junction should not be carried by any portion of the circuit board that might bend or buckle, thereby causing the thermocouple junction to be mispositioned with respect to the portion of the component or other object whose temperature is to be sensed and measured.

Of course, the prior art in the field of thermocouple probes is very highly developed. An example of such prior art is U.S. Pat. No. 3,539,400-Pustell, issued Nov. 10, 1970. That patent discloses a "composite support" for a thermocouple probe for operation in a high-temperature environment. Pustell shows a sheathed thermocouple junction, part of which is in turn surrounded by another sheath that is designed to be particularly resistant to the environment. However, the space between the two aforementioned sheaths is packed tightly with a refractory material for the purpose of "substantially eliminating all voids between sheaths, ..." Moreover, Pustell shows no means for causing the thermocouple probe to be temporarily attachable to a device whose temperature is to be measured, because the Pustell thermocouple probe was designed primarily for sensing the temperature of hot oases flowing through an aircraft gas turbine. Further, Pustell provides no means for exerting a force to maintain the thermocouple probe in close contact with a device or other solid object. Still further Pustell's disclosure does not include any means for supporting the mass of the thermocouple probe other than through the thermocouple leads and their sheaths.

A thermocouple heat sensor which does include means for physical support is illustrated in U.S. Pat. No. 4,626,643-Minet, issued on Dec. 2, 1986. The Minet patent discloses a heat sensor for measuring the temperature of a product heated in a microwave oven. Provision is made for shielding a thermocouple junction from the microwave energy in the oven, rather than from high-temperature gases. Between the shielding material and the thermocouple junction and its electrical leads there are solid spacers which would be effective conductors of heat from the environment to the thermocouple junction. Moreover, the Minet disclosure, like the Pustell disclosure mentioned above, contemplates relative motion in an axial direction between the shielding material, on the one hand, and the thermocouple junction and its electrical leads on the other hand. The Pustell patent provides, between lines 47 and 50 of Column 3, that the "inner material sheath 20 is permitted to float or slip between the environmental resistant material sheath 22 and thermocouple probe sheath 18 when the thermocouple assembly is subjected to vibration, thermal shock, or differential expansion." Similarly, Minet provides separate spring loading which effectively ensures that the microwave-protective material and the thermocouple junction and leads are advanced at different rates. There is no means for assuring, or even permitting, rigidity of the shielding material with respect to the thermocouple junction in an axial direction. Moreover, Minet discloses a "thermally conductive pad" at the end of his microwave-protective material which virtually guarantees the conduction of heat from ambient air to the thermocouple junction.

Although Minet does provide structural means for supporting the heat sensor, he provides no means for precisely positioning it with respect to a very small component or object whose temperature is to be sensed and measured. The Minet sensor would not be at all suitable for measuring the temperature of the leg of an electronic device positioned on a circuit board, for instance. Accordingly, it appears that the prior art, as represented by the aforementioned patent references, is grossly deficient in disclosing satisfactory means for sensing and measuring the temperature of small components or objects in a hot environment without distortion by reason of the presence of the hot environment.

OBJECTS OF THE INVENTION

In view of the deficiencies of the prior-art temperature-sensing devices and their inapplicability to the peculiar problems inherent in surface-mount techniques employed in the manufacture of present-day circuit boards, it is an object of my invention to provide a probe for sensing and measuring the temperature of a very small object such as an electronic component (or a portion thereof) positioned on a circuit board.

It is another object of my invention to provide a probe having a sensor tip capable of maintaining its own contact or of being maintained in intimate thermal contact with an object whose temperature is to be sensed and measured.

It is a further object of my invention to provide a probe, including a thermocouple Junction, in which the thermocouple Junction and its electrical leads are shielded from ambient gases in such a way that the temperature of those gases does not interfere with the measurement of the temperature of a device or component of interest.

It is a still further object of my invention to provide a probe which can be quickly and easily attached to and removed from a device whose temperature is to be sensed and measured, without damaging or altering either the probe or the device.

It is still another object of my invention to provide a probe which can be quickly and easily secured to and removed from a circuit board on which a device or component is placed and which can assure that no relative motion takes place between the probe and the device or component or between the device or component and the circuit board during motion of the circuit board in or through an oven or other processing apparatus.

It is yet a further object of my invention to provide a probe which can maintain firm contact with a component or device on a circuit board without relative motion between the probe and the component or device, despite possible distortion of the circuit board by reason of changes of temperature or other conditions.

SUMMARY OF THE INVENTION

Briefly, I have fulfilled the aforementioned and other objects of my invention by providing a probe including a thermocouple junction and electrical leads therefor, a metallic shielding tube surrounding but spaced from the electrical leads and extending along them to the thermocouple junction, where the thermocouple junction is rigidly retained in position centrally in the end of the tube by a sealing member made of heat-resistant, electrically-and-thermally-insulating material so that the thermocouple junction cannot move radially or axially in the end of the tube. I prefer that the thermocouple junction and its electrical leads be encased in a protective sheath and that the sheath be in turn separated by an airspace from the aforementioned tube throughout most of the length of the sheathed leads within the tube.

I further provide for the sensor tip, comprising the aforementioned thermocouple junction supported by the heat-resistant material and the end of the metallic shielding tube, to be held in contact with the component or object whose temperature is to be sensed and measured. The mechanical force necessary to maintain such contact may be provided by means of a wire hook which cooperates with the sensor tip to grip the component or object between them during the sensing and measurement of temperature of the component or object. The wire hook may be biased by a spring to maintain such contact except when such contact is released by manually overcoming the spring bias. Alternatively, the cooperation of the hook with the sensor tip to embrace or retain the component or object may be obtained by forming the hook of wire which is elastic and which is slightly deflected at one point to bias it away from the sensor tip. By partially overcoming the spring bias of the elastic hook wire, the hook and the sensor tip can, once again, be caused to grip the component or object whose temperature is to be sensed and measured.

Still another way for the sensor tip to maintain contact with the component or object whose temperature is to be sensed and measured is to provide a clamp arm having an end which cooperates with the sensor tip and which is formed of elastic material. When the end of the clamp arm remote from the sensor tip is deflected by a mechanism such as a cam assembly, the end of the clamp arm facing the sensor tip can be caused to act in pincer fashion with the sensor tip to grip between them the component or object whose temperature is to be sensed and measured.

I am also able to exert mechanical force to cause the sensor tip to remain in firm contact with the component or object whose temperature is to be sensed and measured, such contact being accomplished by pressure from one side by the sensor tip and by a reactive force from a circuit board supporting the component or object. Such pressure may be maintained by employing an elastic material such as tempered stainless steel in the tube that shields the thermocouple junction and its leads. The elastic tube may be bent at an angle such as a right angle near the end containing the sensor tip and mounted in cantilever fashion at the end remote from the sensor tip. In that way, deflection of the elastic tube between the right-angle bend and the cantilever mounting causes the sensor tip to exert a force against the component or object when such component or object is positioned on a circuit board. Still another way to cause the exertion of such a force is to furnish a spring-loaded mounting for the sensor tip so that the force of the slightly-compressed spring urges the component or object against the circuit board on which it is positioned while maintaining intimate thermal contact between the sensor tip and the component or object. Finally, the probe may be pivoted and fitted with an adjustable weight that controls the force exerted by the sensor tip on the component or other object. In any of the aforementioned configurations, adjustable mountings may be provided to permit translation of the sensor device in a linear direction or rotation of the body of the probe in either a horizontal plane or a vertical plane or simultaneously about vertical and horizontal axes.

BRIEF DESCRIPTION OF THE DRAWINGS

The invention summarized above will be described in detail in the following specification. The specification will be best understood if read while referring to the accompanying drawings in which:

FIG. 3 illustrates in detail the end of the probe body proximate the sensor tip and shows clearly the thumb actuator, the spring compressed by the thumb actuator, and the hook wire that may be urged away from the sensor tip to release the component when the spring is compressed by the thumb actuator;

DETAILED DESCRIPTION OF THE PREFERRED EMBODIMENTS

Figure 1:
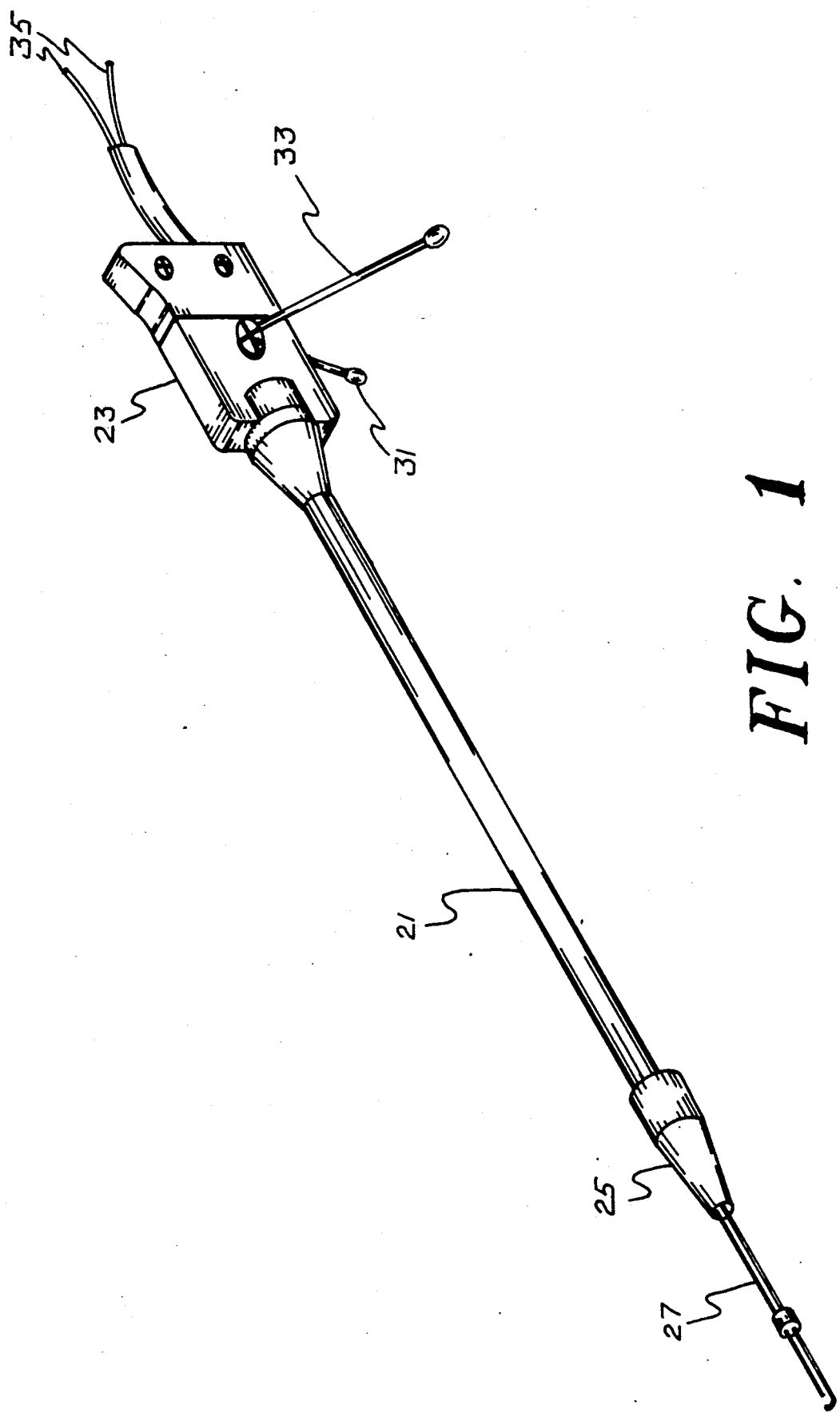
FIG. 1 is a perspective view of the probe in accordance with my invention, showing a thumb-actuator means for compressing a spring to separate a hook from the sensor tip to accommodate the component or object whose temperature is to be sensed and measured. The figure also shows leg means for supporting the probe at the end remote from the sensor tip, and electrical connector means for conducting a signal voltage from the thermocouple leads to instrumentation for indicating or displaying such voltage as a measure of temperature.

Turning to FIG. 1 of the drawings, we see in perspective a representation of one form of the probe in accordance with this invention. A probe body 21 serves as a hand grip for the probe and acts to protect the electrical leads of the thermocouple junction which pass through the interior of probe body 21. It also provides a strong support for an electrical connector 23 attached to the inboard end of probe body 21. At its outboard or "forward" end, probe body 21 guides and supports the axial motion of a thumb actuator 25 which in turn supports a cantilevered tube 27 through the medium of a spring stop 29, illustrated in FIG. 3 of the drawings. As will be better shown in FIG. 4, tube 27 carries at its forward end the sensor tip of which the thermocouple junction is a part.

Electrical connector 23, or some other inboard portion of probe body 21, may carry first and second support legs 31 and 33 respectively for supporting the inboard end of the probe. Henceforward, the word "rear" will be used to denote the inboard end of the probe, while the word "forward" will be used to denote the outboard end of the probe where the sensor tip is located. First support leg 31 and second support leg 33 may be pivoted to electrical connector 23 about an axis normal to the longitudinal axis of probe body 21. Such a pivotal connection permits the legs to be adjusted to control the height of the rear end of the probe to maintain the optimum angular relationship between the sensor tip and the component or other object to which it may be attached. Alternatively, the adjustment of first support leg 31 and second support leg 33 may stabilize the probe in a horizontal plane, if so desired, or may serve to provide clearance between the probe and obstructions beneath it. A cable 35 or a pair of wires may run from electrical connector 23 to a measuring instrument which converts the voltage differential from the thermocouple junction to an indication of temperature sensed by the thermocouple junction. An instrument which is suitable for this purpose is the Model DP-284-K Thermocouple Thermometer marketed by Omega Laboratories of Stamford, Conn.

Figure 2:
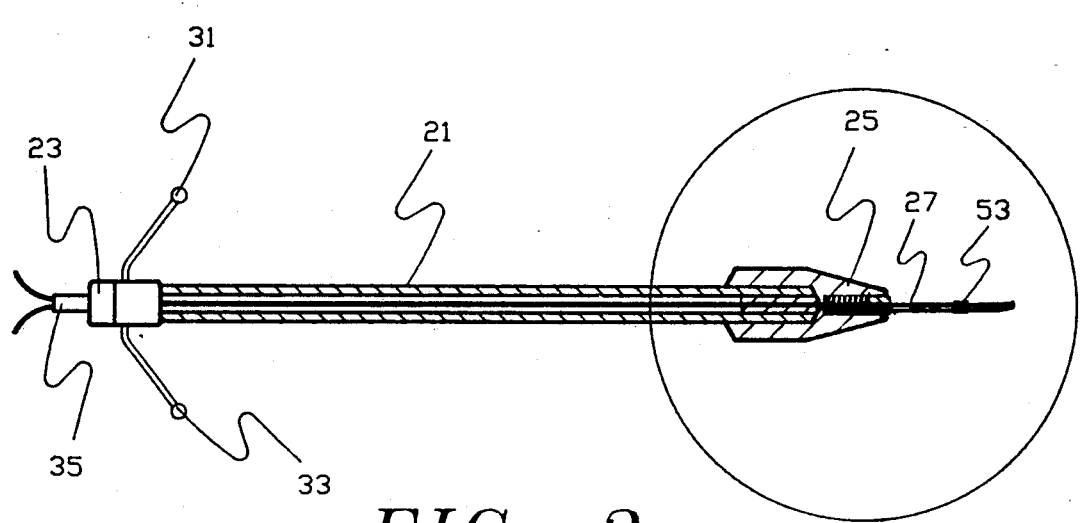
FIG. 2 is a sectional view of the probe body, actuator, and sensor tip, again showing at one end the support legs and electrical connector.

The sectional view of FIG. 2 shows in more detail the elements of my invention which have been referred to in the discussion of the perspective view of FIG. 1.

Figure 3:
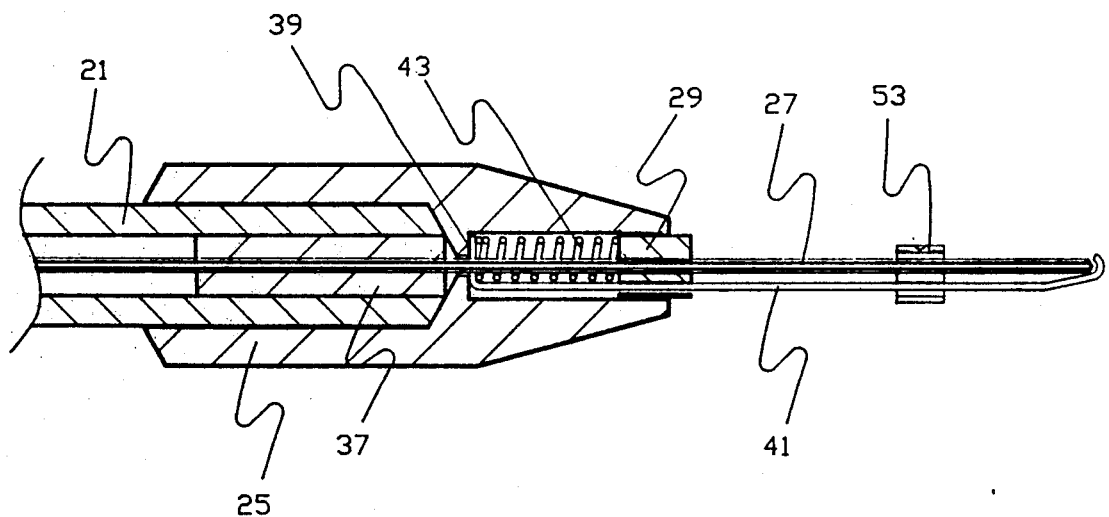
FIG. 3 is an enlarged sectional view of the portion of the probe encircled in the view of FIG. 2. Specifically.

Referring now to FIG. 3 of the drawings, we see probe body 21, which serves as a hand grip for the probe. It may be fabricated from hard aluminum tubing or some other suitable tubular material. At the inboard or back end, probe body 21 is rigidly attached to electrical connector 23. At the outboard or forward end, it is bonded to an internal spacer 37, which is in turn bonded to tube 27, passing concentrically therethrough. It is desirable that tube 27 be formed from stainless steel. The sheathed electrical leads from the thermocouple junction pass through tube 27 and are doubly protected by tube 27 and by probe body 21, which together serve as the structural backbone of the probe. Although probe body 21 and tube 27 are rigidly separated by internal spacer 37 and by a similar rigid support at the inboard end of the probe, probe body 21 and tube 27 are separated by airspace throughout the greater part of their respective lengths. Thus, unlike the structural arrangements in the inventions of U.S. Pat. Nos. 3,539,400-Pustell and 4,626,643-Minet, the outer shield of probe body 21 is thermally isolated from tube 27 and from its thermocouple leads by relatively nonconductive airspace, rather than by the solid material which Pustell and Minet stress is present in their respective thermocouple probes.

Slidable upon the outboard end of probe body 21 is a thumb actuator 25, which is a generally cylindrical and frustoconical body having a first bore at one end to receive the outboard end of probe body 21 and a second bore at the other end to receive a small loop 39 formed at the inboard end of a hook wire 41 that extends outward from the second bore, parallel to tube 27 and in the general direction of the sensor tip. Also accommodated within the second bore in thumb actuator 25 is a coil spring 43, of which one end bears against small loop 39 of hook wire 41, while the other end bears against spring stop 29 which, as explained, is bonded to tube 27. Thus, the sliding motion of thumb actuator 25 is guided by the outboard end of probe body 21 and by spring stop 29. Spring stop 29 is bonded to tube 27 at a position such that it causes a substantial compressive preload on coil spring 43. Again, the other end of coil spring 43 bears against small loop 39 formed in the inboard end of hook wire 41 and holds small loop 39 against a shoulder in the center of the second bore in thumb actuator 25. The fit of the components is such that thumb actuator 25 slides smoothly on the outboard end of probe body 21 and on spring stop 29, thus providing additional lateral support to the outboard end of tube 27.

Thumb actuator 25, spring stop 29, and internal spacer 37 may all be fabricated from a plastic material such as polyamide. The polyamide material can operate at high temperatures and has a low thermal conductivity and a low coefficient of friction.

Figure 4:
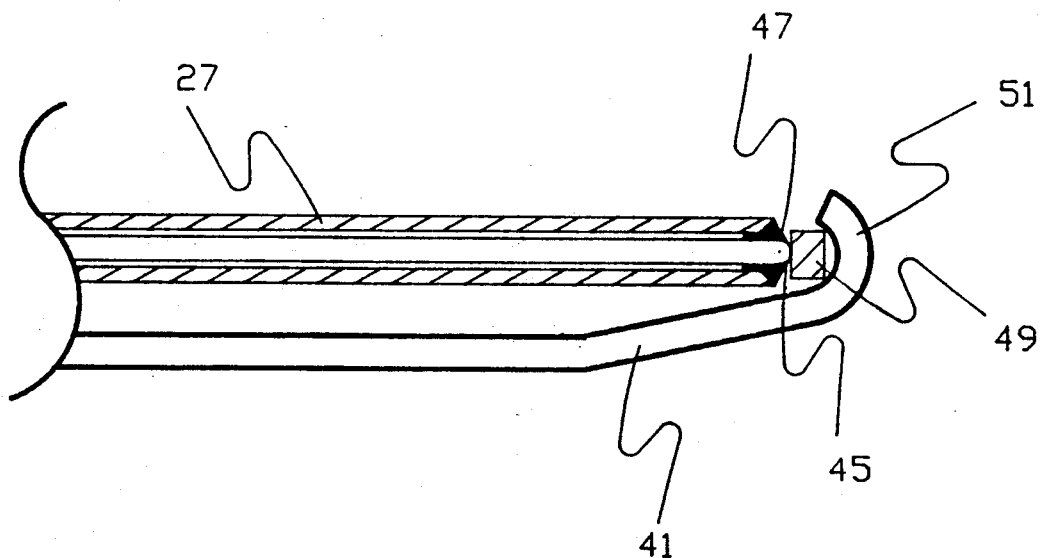
FIG. 4 is an enlarged sectional view of the sensor tip, showing the constituent parts of the sensor tip and illustrating the way in which a component or device may be gripped between the sensor tip and the aforementioned hook.

The temperature-sensing capability of the probe in accordance with my invention is concentrated in a sensor-tip assembly illustrated in enlarged detail in FIG. 4 of the drawings. The sensor-tip assembly comprises a subminiature thermocouple junction preferably grounded to a stainless steel sheath 45 which extends backward from the thermocouple junction to protect the electrical leads to which the junction is connected. As aforementioned, the thermocouple leads extend backward through tube 27 to electrical connector 23, where they are coupled to cable 35 and ultimately to the temperature-indicating instrument. Although I prefer to employ a grounded thermocouple junction, a thermocouple having an ungrounded junction or an exposed junction may alternatively be used.

FIG. 4 of the drawings shows how the active end of thermocouple sheath 45 is positioned slightly beyond the end of tube 27 and centered therewith. The annular gap between the respective ends of tube 27 and thermocouple sheath 45 is filled with a high-temperature-resistant low-thermal-conductivity sealant 47, which may be an elastomeric material such as "Superflex," a product of Loctite Corporation. Sealant 47 helps to minimize the effect of the temperature of hot ambient gases on the thermocouple junction by centering the sensor tip, including the sheathed thermocouple junction, just beyond the end of tube 27 and by sealing the gap between them without any metal-to-metal contact with tube 27.

Tube 27 should be fabricated from a strong, elastic, hard and smooth material such as the type of stainless steel known as "22-gauge needle tubing." As aforementioned, the inside diameter of tube 27 is larger than the outside diameter of thermocouple sheath 45, so that the radial clearance between them functions as a thermal barrier. Thus, when tube 27 is exposed to ambient temperatures higher or lower than the temperature of the object whose temperature is to be sensed and measured, the air gap insulates the tubular stainless steel sheath of the thermocouple from the influence of ambient gas temperature.

As illustrated in FIG. 4, the component or object 49 whose temperature is to be sensed and measured may be gripped between the end of thermocouple sheath 45 and hook 51 formed in the outboard end of hook wire 41.

From hook 51, hook wire 41 extends in an inboard direction through a clearance hole in spring stop 29 to its inboard end, where it terminates in small loop 39, accommodated within the inboard end of the second bore in thumb actuator 25. It is important that there be sufficient clearance for hook wire 41 to slide within its hole in spring stop 29. At some point between spring stop 29 and hook 51, I prefer to provide a hook guide 53, through which hook wire 41 passes and to which it is rigidly bonded. Hook guide 53 has a clearance hole for the passage of tube 27 and is arranged to slide thereon. Thus, the spacing between tube 27 and hook wire 41 in a lateral direction is controlled by hook guide 53 without impeding the relative motion between tube 27 and hook wire 41 in an axial direction.

When thumb actuator 25 is slid forwardly toward the sensor-tip assembly, it compresses coil spring 43 and carries with it hook wire 41, thereby opening a gap between the end of thermocouple sheath 45 and hook 51. When thumb actuator 25 is released, the force of coil spring 43 causes hook 51 to move toward the end of thermocouple sheath 45, thereby firmly gripping object 49 which has meanwhile been interposed. As will be noted from FIG. 4, the outer surface of the end of thermocouple sheath 45 and the inner surface of hook 51 are both curved. Thus, if the cross section of object 49, held within the sensor-tip assembly as shown in FIG. 4, is rectangular, the user of the probe need not be concerned about achieving perfect alignment of the probe, normal to the surface of object 49. Similarly, the placement of object 49 with respect to hook 51 is not critical. A firm mechanical and thermal contact between object 49 and both thermocouple sheath 45 and hook 51 is practically assured.

Figure 5:
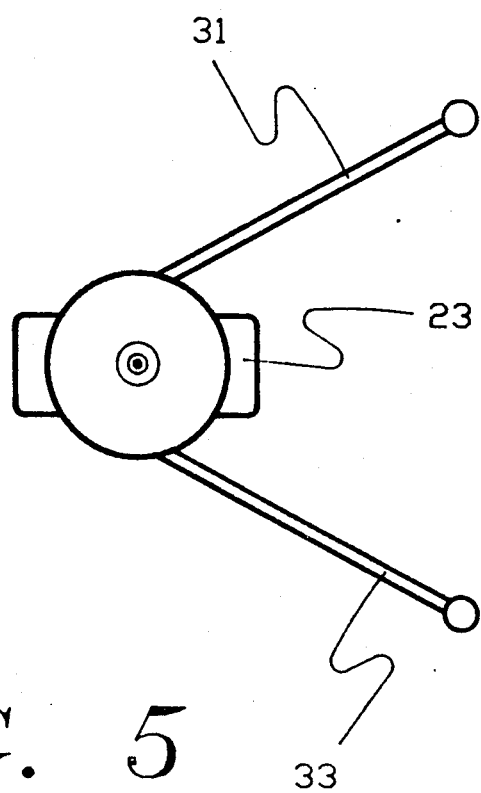
FIG. 5 is an end view of the probe as illustrated in FIG. 2 and showing one arrangement of the support legs for holding up the end of the probe remote from the sensor tip.

The size of the sensor-tip assembly can be scaled to accommodate larger or smaller objects than illustrated in FIG. 4. Moreover, types of heat sensors other than thermocouple junctions can be accommodated. Thermistors, resistance temperature devices ("RTDs") and thin-film detectors ("TFDs") may, if desired, be employed as the sensors in this probe according to my invention. However, I do prefer that hook wire 41 and hook 51 be formed of tempered stainless steel in order to provide sufficient elasticity and heat resistance. Hook guide 53 may be formed of brass and may be swaged onto hook wire 41 in order to retain it in position on hook wire 41 as illustrated in FIG. 3. Spring stop 29 is fastened to tube 27 where tube 27 passes through the spring stop. However, spring stop 29 has an off-center clearance hole for through passage of hook wire 41, which is guided by spring stop 29 without being immovably connected to it. First support leg 31 and second support leg 33, as illustrated in FIGS. 2 and 5 of the drawings, may be formed from stainless-steel wire or other satisfactory material, preferably formed with a small loop or fitted with round objects on their extremities to prevent them from damaging the surface on which the inboard end of the probe rests.

Figure 6:
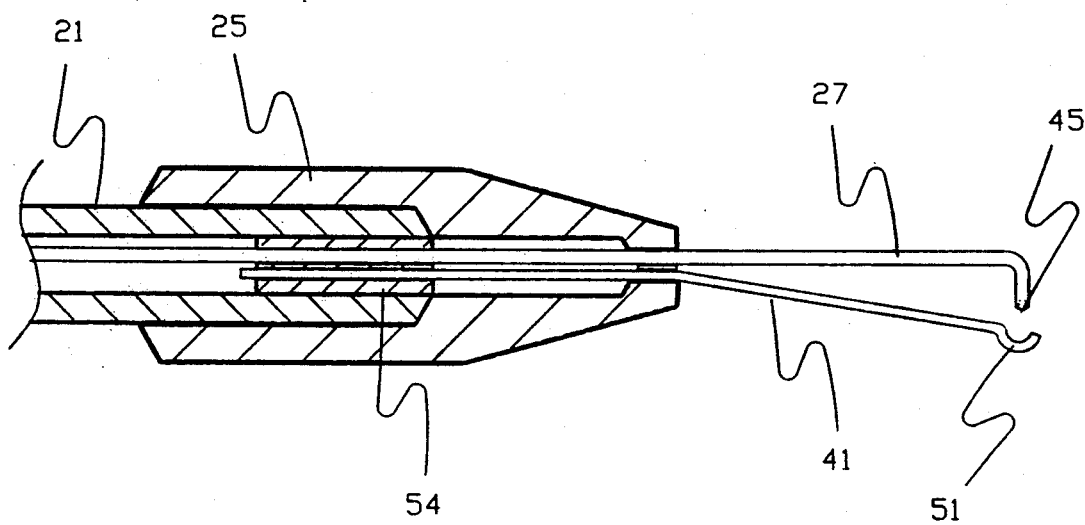
FIG. 6 is a sectional view of a variant of the probe in which the elastic hook wire, slightly deflected at one point, is caused by forward motion of the thumb actuator to approach the sensor tip and grip the component or other object.
Figure 7:
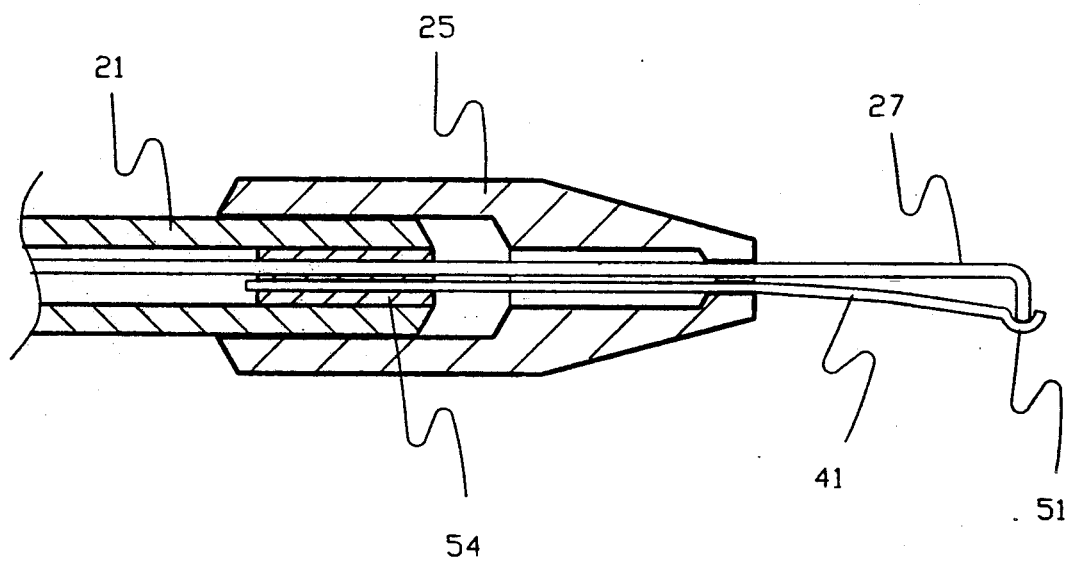
FIG. 7 is a sectional view of the same parts illustrated in FIG. 6, but in which forward motion of the thumb actuator has brought the hook into contact with the sensor tip.

If it becomes necessary to sense and measure the temperature of an object having surfaces oriented generally parallel to the axis of the probe, or perhaps normal to the axis of the probe and generally cylindrical in outline, a probe having a "gripping configuration" as illustrated in FIGS. 6 and 7 of the drawings may be useful. In the configuration shown in those two figures, tube 27', bearing the sensor tip at its end and having the thermocouple leads passing through it, is bent through an angle of approximately 90 degrees near its forward end and the thermocouple Junction. The inboard end of tube 27' is supported by and bonded to a dual spacer 54, which in turn is bonded to the internal surface of probe body 21. Tube 27' passes through a first bore in dual spacer 54 in the direction of electrical connector 23, not shown in FIGS. 6 and 7. A second bore formed in dual spacer 54 supports the inboard end of hook wire 41 which, like tube 27', is bonded to dual spacer 54 to prevent relative motion in an axial direction therebetween. The forward portion of thumb actuator 25 has a pair of apertures. Tube 27' passes through a first such aperture with sufficient freedom to permit relative motion in an axial direction. Hook wire 41 passes through the other aperture in the forward portion of thumb actuator 25 and, likewise, is permitted relative motion in an axial direction with respect to thumb actuator 25.

Hook wire 41 is slightly bent so that, when thumb actuator 25 is fully retracted and in contact with dual spacer 54, hook wire 41 defines a substantial angle with the major portion of tube 27'. However, when thumb actuator 25 is slid forward along the outer surface of probe body 21 toward the sensor tip, the aperture walls in the forward portion of thumb actuator 25 force part of hook wire 41 to rotate counterclockwise toward tube 27', thereby tending to close the gap between hook 51 and the end of thermocouple sheath 45. As shown in FIG. 7, hook 51 may come into contact with the end of thermocouple sheath 45 constituting the sensor tip. Alternatively, they might "grasp" between them a cylindrical component or other object having an axis roughly normal to the longitudinal axis of the probe. A component or other object can be retained in that position while its temperature is sensed and measured, whereupon thumb actuator 25 may be slid back away from the sensor tip, allowing the elastic material of hook wire 41 to resume its bent configuration and causing hook 51 to separate from the sensor tip, thereby releasing the component or other object.

As has been shown, when a component or other object is gripped between hook 51 and the sensor tip, the elastic nature of hook wire 41 causes the sensor tip to be pressed firmly against the surface of the component or other object, thus assuring good thermal contact and permitting the accurate sensing and measurement of the temperature of the component or other object. This configuration is particularly useful in monitoring the temperature of selected components or locations on a circuit board as it passes through a reflow oven, a wave soldering machine, or any other type of process equipment for simultaneously soldering multiple electronic components to a circuit board. In such processes, as has already been noted, it is necessary to monitor the temperature at the "hottest" and "coldest" places on the board in order to ensure that no electronic components are overheated, while still applying enough heat to obtain good solder joints over the entire board. Until the advent of this invention, there has been no satisfactory method or equipment for temporarily attaching heat sensors to precisely determined portions of circuit-board assemblies for this purpose. It is noteworthy that temporary attachment is necessary because permanent attachment to components on the circuit board can damage the board or the components, and installation thereof would be very expensive.

As has been earlier explained, surface-mounted electronic components are particularly susceptible to being moved out of their desired positions, either before or during soldering while they are resting on solder paste, or during the time when the solder becomes fluid as it is heated. For this purpose, a probe which maintains thermal contact with the component but does not tend to move it on the circuit board is especially useful.

Figure 8:
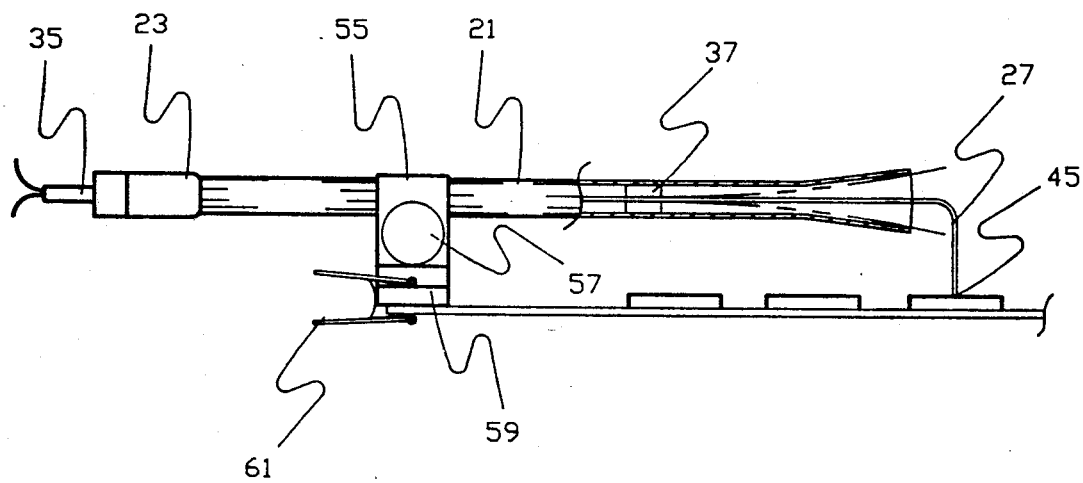
FIG. 8 is an elevation view, partly in section, showing a variant of the invention in which the tube surrounding the leads from the thermocouple junction has been bent at substantially a right angle so that deflection of the tube in the plane of the paper causes the sensor tip to exert force on a component or object disposed on a circuit board below it.
Figure 9:
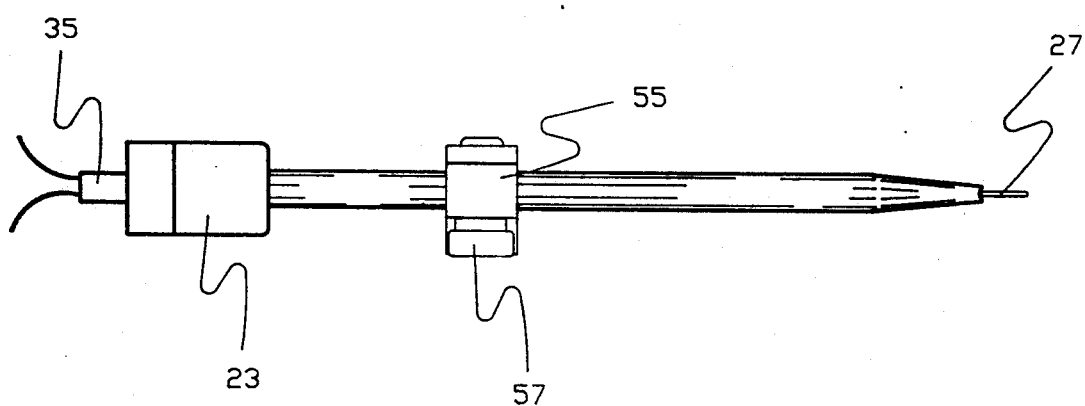
FIG. 9 is a plan view of the same variant of the invention illustrated in the elevation and sectional view of FIG. 8.
Figure 10:
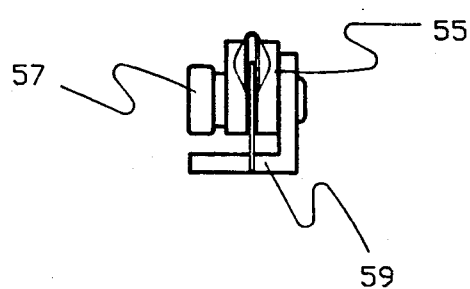
FIG. 10 is an end view of the same variant, showing the way in which the tube housing the leads of the thermocouple is permitted to move up and down in a vertical plane but constrained by a narrow aperture, formed in the tube, to prevent motion of the tube in a horizontal direction.

One way of applying mechanical force to an electronic component without moving it along the surface of a circuit board is illustrated in FIGS. 8 through 10 of the drawings. In the species of my invention illustrated in those figures, force applied to an electronic component or other object is exerted in a direction normal to the surface of the circuit board, and thus has no constituent part which would tend to move the electronic component either transversely or rotationally on the surface of the circuit board. In the configuration illustrated in these figures, a miniature or sub-miniature thermocouple junction is once again protected by a sheath which, together with the junction, forms the temperature-sensitive "nose" of the sensor tip. An annular sealant 47 retains the thermocouple junction just beyond the outboard end of tube 27', which encases the thermocouple leads from the junction back toward electrical connector 23 and ultimately to the measuring instrument. In this configuration, tube 27' is bent so that its outboard end is approximately perpendicular to its inboard end. Thus, the outboard end of tube 27', through the sensor tip at its extremity, can exert mechanical force on the component or other object whose temperature is to be sensed and measured. The inboard leg of tube 27' is supported by and secured to internal spacer 37, which is supported by and bonded to the inner surface of probe body 21. Tube 27' should be fabricated from tempered stainless steel, or some other similar material characterized by substantial elasticity and high resistance to extreme temperatures.

The outboard or forward end of probe body 21 is, in this configuration, somewhat flattened in a vertical plane so that its extremity defines a narrow, oblong, vertically-oriented aperture through which tube 27' passes.

The inboard leg of tube 27' is slightly bent so that, in its unstressed, "rest" position, it contacts the extremity of probe body 21 at the lower end of the aforementioned aperture. When the probe is positioned with the sensor tip in contact with a component or other object whose temperature is to be sensed and measured, the mechanical force applied to the component in a direction normal to the circuit board is generated by bending the inboard leg of tube 27' upward toward a horizontal position, whereby the outboard of tube 27' is brought into a substantially vertical orientation. The mechanical force brought to bear on the component or other object is determined by the elasticity of tube 27' and by the height at which probe body 21 is set and supported.

In some applications it may be advantageous to provide additional compliance between the inboard and outboard legs of tube 27' so that, when the inboard leg of tube 27' is bent to generate a mechanical force on the sensor tip, it will not induce a significant horizontal component of force on the vertical outboard leg of tube 27'.

This can be accomplished in many ways. For example, the vertical outboard leg of tube 27' can be notched on opposite sides of its upper end, just below the bend, to produce a flexural pivot that is compliant in the plane of tube 27' but stiff laterally. Thus it is capable of transmitting to the outboard leg the downward mechanical force resulting from bending the inboard leg without exerting any significant horizontal component of force.

Alternatively, the outboard leg can be separated from the inboard leg just below the bend and the two joined with a compliant coupling such as a high-temperature elastomeric sleeve or a tight-fitting stainless-steel spring.

In each of the above-mentioned configurations, the sheathed thermocouple leads would still pass through both legs and the flexural joint.

Probe body 21 may be supported and gripped by a clamp 55 which either permits or restrains relative motion between clamp 55 and probe body 21, and between clamp 55 and a foot 59, depending upon the setting of a knob 57 that tightens or loosens a screw within clamp 55 as shown in FIGS. 8 through 10. Clamp 55 is supported upon foot 59 which has a horizontal portion, as illustrated in FIG. 10, that may rest upon the edge of a circuit board or other flat supporting surface. I prefer to retain clamp 55 in desired position by temporarily fastening foot 59 to the edge of the circuit board or its support by means of a spring clip 61, a screw clamp, or other equivalent means for temporarily fastening things together.

Tests have shown that the small, hemispherical configuration of the sensor tip enables a small force applied by the deflection of tube 27' to result in a high contact pressure with the component or other object whose temperature is to be sensed and measured. These tests have shown that an applied force of one ounce is more than adequate to achieve a response time of about one second by the sensor.

If, for some reason, it is desired to apply a greater force to the component or other object, tube 27' may be deflected to a position approximately illustrated by the upper dash line in FIG. 8. In that event, it might be desirable to alter temporarily the angle of the bend between the inboard and outboard legs of tube 27', so that the outboard leg could still be positioned vertically and exert a force against the component or other object normal to the surface of the circuit board. If this were done, it might be desirable to raise the level of the inboard portion of probe body 21 by clamping foot 59 to a stationary base somewhat higher than the level of the circuit board, whereby the orientation of probe body 21 would be changed to slope downward in a forward direction toward the sensor tip. However, it is contemplated that, for most uses of the probe, the elasticity of tube 27' should be chosen such that the right-angle bend of tube 27' is appropriate and that the position of the inboard leg of tube 27' will be approximately horizontal or centered in the aperture, permitting probe body 21 to be supported upon clamp 55 in a substantially horizontal position.

Increased force would be available by installing a second tempered-stainless-steel tube over tube 27', extending from spacer 37 to the start of the bend in tube 27'. The resulting increase in stiffness would be related to the wall thickness of the second tube.

If the probe is to be employed in monitoring the temperature of electronic components on a circuit board passing through a reflow oven, the configuration represented by FIGS. 8 through 10 has several clear advantages, as follows:

1) The entire sensor tip has minimal thermal mass and cross-sectional area. There is no necessity for any "hook wire" or other member that would bring additional thermal mass into contact with the component. Accordingly, the probe will not cause significant perturbation of the temperature distribution among the various circuit components and the circuit board while in the oven.

2) The sensor tip does not "grip" the component but rather presses down on it so that thermal contact is maintained without any likelihood of moving the component on the circuit board.

3) The probe can tolerate the temperature and possible radiation environment within the reflow oven. Only the extreme "nose" of the sensor tip is not fully covered by the shielding of stainless-steel tube 27'.

4) The sheathed thermocouple is effectively isolated from the ambient temperature of the oven by tube 27', except for the sensor tip, which is exposed to contact and thus accurately senses the temperature of the component.

5) The sensor tip can be brought into intimate thermal contact with any selected component on the circuit board without causing adjacent components to move.

6) The probe can accommodate possible warpage of the circuit board, as it passes through the oven, without having the sensor tip lose thermal contact with the component or other object on the board.

7) If the component does move slightly because of bowing or distortion of the circuit board attributable to the high temperatures within the oven, the sensor tip can still maintain firm thermal contact with the component because of the elasticity of tube 27'. A narrow vertical aperture at the end of probe body 21 permits only a slight lateral deflection of tube 27', and imposes safe limits on the vertical deflection of tube 27' during handling and installation.

The steps of a method of using a probe having the configuration of FIGS. 8 through 10 may be enumerated as follows:

1) Attach cable 35 to electrical connector 23 and to external instrumentation for indicating, registering, and/or controlling the temperature of the component or object of interest.

2) Secure the probe to the edge of the circuit board by applying spring clip 61 to hold foot 59 in place on the edge of the circuit board.

3) Loosen clamp 55 by unscrewing knob 57.

4) Lift the outboard or forward end of the probe so that the sensor tip will clear any components on the circuit board.

5) Adjust probe body 21 axially in clamp 55 and radially by pivoting foot 59 on the edge of the circuit board until the sensor tip can be lowered onto the selected point on the circuit board.

6) Press down on the outboard end of the probe body until tube 27' is nominally centered in the flared end of the probe body.

7) Tighten knob 57 to maintain the position of the sensor tip on the component of interest, while also exerting the desired mechanical force on the selected portion of the component of interest.

Figure 11:
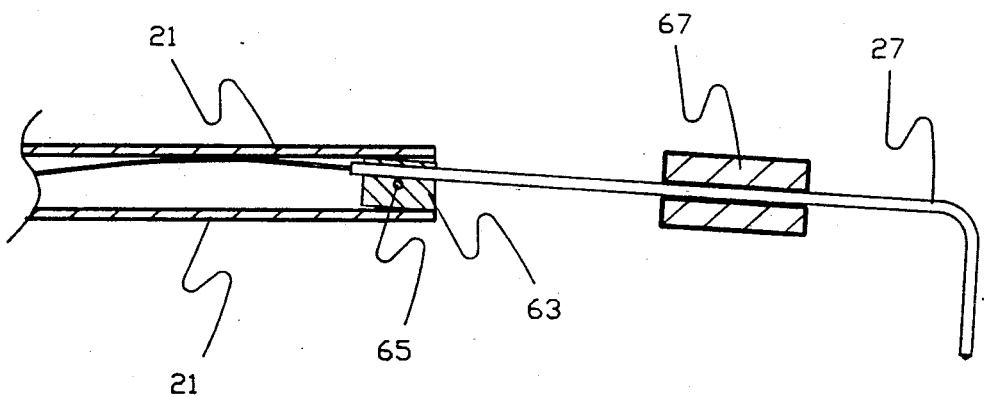
FIG. 11 is a sectional view of a variant of the invention in which the tube of the probe body, surrounding the thermocouple leads, is pivoted at one end to permit rotation in a vertical plane about the aforementioned pivot. A weight adjustable along the tubing of the probe body causes a variable mechanical force to be exerted by the sensor tip against the component or other object whose temperature is to be sensed and measured.
Figure 12:
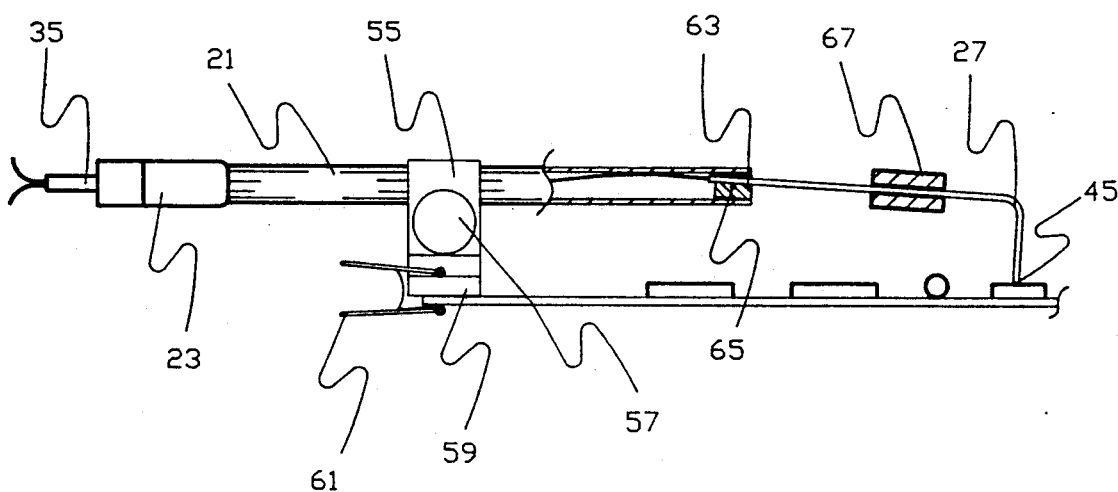
FIG. 12 is an elevation view, partly in section, showing the variant of the invention illustrated in FIG. 11 and further illustrating a possible adjustable mounting for the probe body, such adjustable mounting having a "foot" which can be removably clipped or clamped to the edge of a circuit board having a component positioned thereon.
Figure 13:
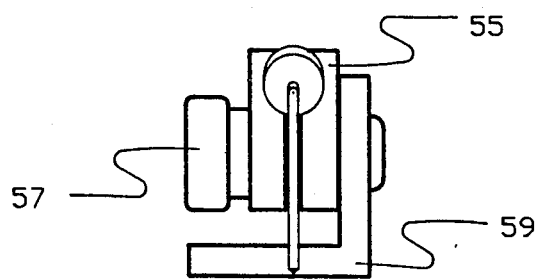
FIG. 13 is an end view of the variant of the invention illustrated in FIGS. 11 and 12.

Another configuration of my invention which enables the sensing and measurement of temperature by a sensor tip of low thermal mass and which does not "grip" the component but rather presses down on it so that thermal contact is maintained without any likelihood of moving the component on the circuit board is illustrated in FIGS. 11 through 13 of the drawings. Reference to FIGS. 11 and 12 shows that tube 27' is once again bent so that its outboard or forward portion, having a sensing tip at its extremity, is arranged to apply mechanical force to a component or other object on a circuit board in a direction substantially normal to the surface of the circuit board. In this configuration, the inboard portion of tube 27' is supported in a pivot block 63 that is pivoted within the outboard end of probe body 21 by a pin 65. As before, probe body 21 is supported and held by clamp 55 mounted on foot 59, which may be clipped to the edge of a circuit board by spring clip 61. In order to apply controllable mechanical force to the component or other object whose temperature is to be sensed and measured, I provide a weight 67 that surrounds the inboard leg of tube 27' and is slidable thereon. The more closely weight 67 approaches the right-angle bend between the inboard and outboard portions of tube 27', the greater the force that is applied to the component by the outboard portion of tube 27', acting through the sensor tip.

The advantage of the configuration of FIGS. 11 through 13 becomes apparent when one considers that the circuit board may bow or become distorted as a result of the high temperatures to which it is exposed in the soldering oven. If the board becomes slightly bowed, rotation of pivot block 63 about pin 65 allows tube 27' to rotate slightly, while weight 67 causes a relatively constant force to be applied by the sensor tip to the component or other object whose temperature is being sensed and measured. A still further advantage of the configuration of FIGS. 11 through 13 is that the probe of this configuration does not inherently apply any bending moment to the circuit board through spring clip 61 or other fastening means by which the probe is temporarily attached to the board. In the configuration of FIGS. 8 through 10, the upward force applied by the component and the board to the outboard leg of tube 27' creates a torque which is transmitted through probe body 21, clamp 55, and spring clip 61, tending to deform the edge of the circuit board. In the embodiment of FIGS. 11 through 13, on the other hand, the force between the sensor tip and the component whose temperature is being sensed and measured is principally due to the gravitational force on weight 67 rather than any bending moment applied to the edge of the circuit board through spring clip 61.

Figure 14:
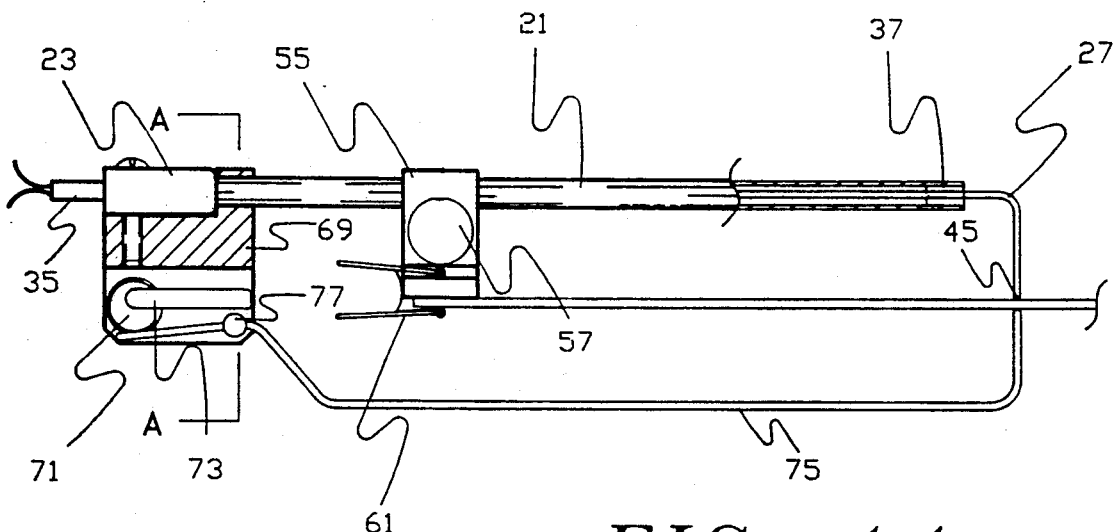
FIG. 14 is an elevation view, partly in section, of a variant of the invention in which a clamp arm is provided in order to grip a component or other object by pincer action in cooperation with the sensor tip, the force to produce such pincer action being generated by a cam bearing on the pivoted end of the clamp arm remote from the sensor tip.

Still another species of my invention is illustrated in FIGS. 14 through 17 of the drawings. This species of my invention employs a probe body 21 carrying a tube 27' which is sealed by means of an internal spacer 37 fixed in the forward end of probe body 21. Of course, tube 27' carries at its outboard end the sensor-tip assembly which is common to the other species of my invention. Probe body 21 is held by clamp 55 carried on foot 59, which may be removably attached to the edge of a circuit board by spring clip 61. Once again, probe body 21 carries at its inboard end electrical connector 23. However, adjoining electrical connector 23 is a holder 69 which is rigidly attached to the inboard end of probe body 21. Holder 69 contains a cam 71 that is pivoted thereto and is operated by means of a cam lever 73. Cam 71 bears against the inboard end of a clamp arm 75, which is pivoted to holder 69 by a short pivot shaft 77. Clamp arm 75 may be formed of elastic material such as stainless-steel spring wire of a diameter such as 0.050 inch. Clamp arm 75 extends forwardly from short pivot shaft 77 in a direction roughly parallel to that of probe body 21. However, clamp arm 75 is formed in such a way as to leave adequate clearance for components that may be attached to the underside of a circuit board, as illustrated in FIG. 14. In that figure, cam 71 has been set by means of cam lever 73 so that it urges clamp arm 75 in a counterclockwise direction about short pivot shaft 77. Accordingly, the outboard end of clamp arm 75 has been brought to bear against the undersurface of the circuit board. The force exerted upon the circuit board by clamp arm 75 may be adjusted by rotating cam 71, thereby causing the desired elastic deflection of clamp arm 75 to take place. The force exerted on the underside of the circuit board by clamp arm 75 is equal and opposite to that exerted by the sensor tip on the top of the circuit board. In that way, the probe does not contribute to any deformation of the circuit board while it is subjected to the high temperature of the gas in the oven.

Figure 16:
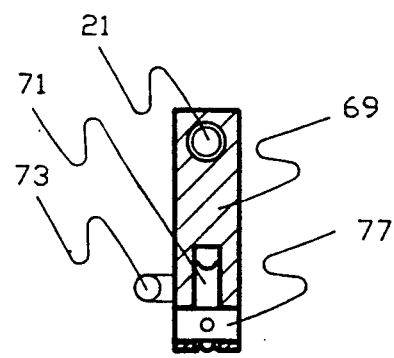
FIG. 16 is a sectional view of the cam assembly and its holder, taken along plane A—A through the cam assembly and holder in FIG. 14.

FIG. 16 is a sectional view, taken along the plane A—A of FIG. 14, that passes through short pivot shaft 77. In FIG. 16, cam 71 is positioned so as to exert maximum counterclockwise rotational force on clamp arm 75.

Figure 15:
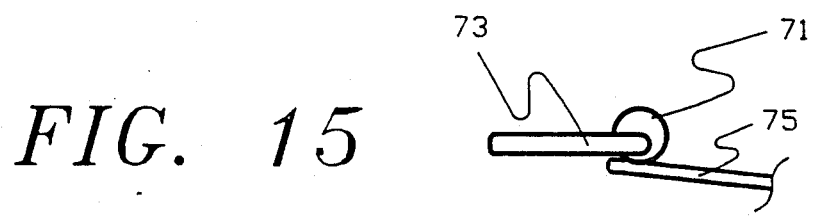
FIG. 15 is an elevation view of the cam assembly bearing on an end of the clamp arm when the clamp arm is not under bending stress and when no force is being exerted on a component between the clamp arm and the sensor tip.
Figure 17:
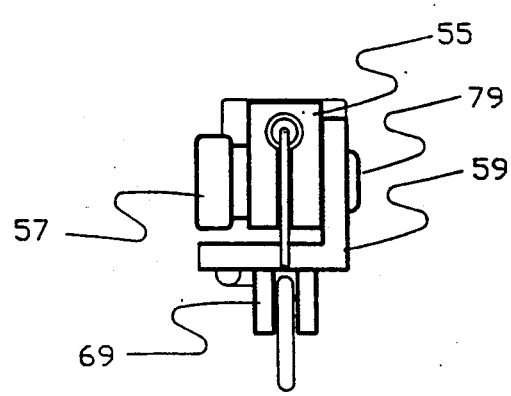
FIG. 17 is an end view of the clamp and knob which support the probe body, and also showing the configuration of the "foot" on which the clamp is mounted and which can be attached by means of a spring clip or clamp to the edge of the circuit board on which is positioned the component or object whose temperature is to be sensed and measured.

When the temperature of a component is not being sensed and measured, and when there is no circuit board or other medium to be "grasped" by the pincer action of tube 27' and clamp arm 75, cam 71 may be rotated into the position shown in FIG. 15. FIG. 17 is an end view of the probe in which cam 71 is rotated so as to cause the probe to be in the position shown in FIG. 14. In the configuration of FIG. 14, it is desirable that internal spacer 37 hold tube 27' firmly at a point relatively close to the right-angle bend where the inboard portion of tube 27' joins the outboard portion of tube 27'. Thus, tube 27' evidences very little vertical compliance between internal spacer 37 and the right-angle bend. Instead, the entire assembly of the probe is permitted to pivot freely about a transverse shaft 79 in clamp 55. This pivoting action about transverse shaft 79 is independent of the clamping action determined by the setting of knob 57, which governs the freedom of probe body 21 to slide axially within clamp 55.

It will be understood that cam 71 may either be inherently eccentric or may be a disk-shaped cam which is eccentrically mounted on a shaft. It will also be understood that the shaft of cam 71 may be bent at right angles to form cam lever 73. The camshaft should be pinned or otherwise fixed to cam 71 so that they will rotate together.

I prefer to design clamp arm 75 so that its outboard end will contact the underside of a circuit board when cam lever 73 is about 45 degrees away from the position shown in FIG. 14. Thus, the last 45 degrees of rotation of the cam causes clamp arm 75 to bend elastically to create the spring force that acts against the underside of the circuit board. This is the force which presses the circuit board and its component against the sensor tip to maintain good thermal contact. It is my preference to design clamp arm 75 in such a way that its outboard end will just contact the underside of a circuit board when cam 71 and cam lever 73 are in a position about 45 degrees displaced from the position shown in FIG. 14. Then, as cam lever 73 is further rotated toward the position shown in FIG. 14, the amount of force exerted by the outboard end of clamp arm 75 is gradually increased. Thus, any desired mechanical force between the sensor tip and clamp arm 75, acting through the circuit board and component thereon, may be selected. Once again, foot 59 may be removably fastened to the edge of the circuit board by means of spring clip 61. Of course, the fastening means is a matter of choice and may be a screw attachment, a clamp or a suction cup. Alternatively, foot 59 may be held in position by a weight or by a magnetic clamping means. On the other hand, foot 59 may be removably fastened to the carrier which in turn supports the circuit board.

Figure 18:
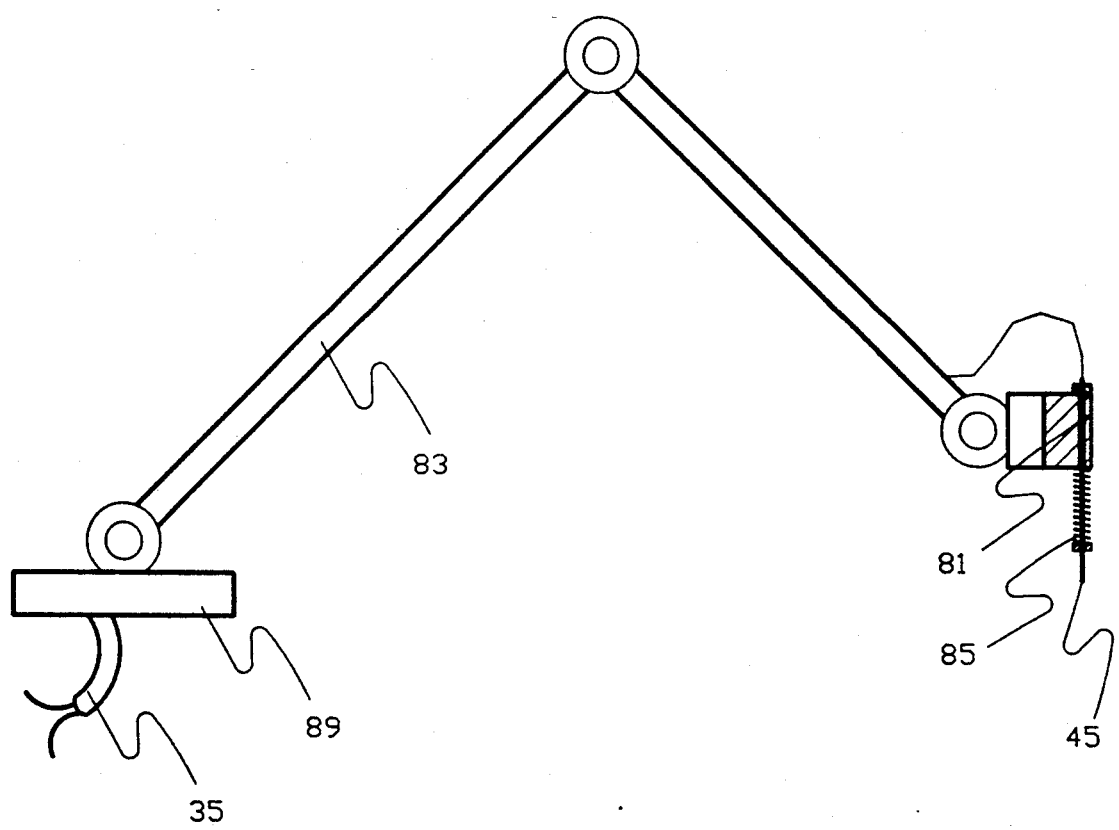
FIG. 18 is an elevation view of a variant of the invention in which the sensor tip is carried in a mounting that is spring loaded to cause the sensor tip to exert mechanical force against a component or other object whose temperature is to be sensed and measured. The mounting is carried on an articulated arm which is in turn supported on a base that is not associated with a circuit board or other medium upon which the component will be set.

For larger-scale applications, the sensor tip may be mounted in a receptacle 81 which is in turn carried by an articulated arm 83. The position of the sensor tip can be biased with respect to receptacle 81 by means of a resilient spring 85 as shown in FIG. 18 of the drawings. Also as shown in that figure, the thermocouple leads may be guided back through articulated arm 83 to a base 89, which may be supported independently of any circuit board or other object the temperature of which is to be measured. By adjusting articulated arm 83, any desired amount of mechanical force may be generated in resilient spring 85 to maintain close thermal contact between the sensor tip and the component or other object whose temperature is to be sensed and measured.

The foregoing disclosure sets forth fully the most-favored embodiments of my invention known to me at the time of filing of my application. Recognizing that certain changes therein may be made by others without departing from the scope of the invention, I set forth my invention in the following claims which, with their equivalents, are desired to be secured hereby.

I claim:

1. Probe apparatus for sensing the temperature of at least one electronic component positioned on the surface of a circuit board without causing appreciable relative motion between said component and said circuit board, said apparatus comprising:
   (a) a thermocouple junction of dissimilar materials, said thermocouple junction having a protective sheath thereon,
   (b) first and second electrical leads disposed axially inside said protective sheath and terminating at said thermocouple junction,
   (c) tubular metallic means surrounding said protective sheath and said first and second electrical leads to a point substantially abreast of said thermocouple junction but spaced from said sheath and said junction,
   (d) thermally-and-electrically-insulating means for rigidly maintaining the position of said junction substantially centered within and radially spaced from an end of said tubular metallic means substantially abreast of said junction to prevent relative motion between said thermocouple junction and said tubular metallic means in an axial or radial direction, and
   (e) means for causing said protective sheath and said thermocouple junction to make good thermal contact with said component without displacing said component on said circuit board in a direction either normal to or parallel to said circuit board.

2. Apparatus in accordance with claim 1 in which said thermally-and-electrically-insulating means is sufficiently rigid substantially to prevent relative motion in a radial or axial direction between said junction and said tubular metallic means.

3. Apparatus in accordance with claim 1 in which said sheathed thermocouple junction, said thermally-and electrically-insulating means and said end of said tubular metallic means are combined to form a sensor tip of said apparatus.

4. Apparatus in accordance with claim 3 in which said thermocouple junction is electrically connected to its protective sheath.

5. Apparatus in accordance with claim 1 in which said device is an electronic component.

6. Apparatus in accordance with claim 1 in which said device is a localized temperature-sensitive portion of a circuit board assembly.

7. Probe apparatus for sensing the temperature of at least one electronic component positioned on the surface of a circuit board without causing appreciable relative motion between said component and said circuit board, said apparatus comprising:
   (a) a thermocouple junction of dissimilar materials having a sheath for supporting and protecting said thermocouple junction against damage.
   (b) first and second electrical leads terminating at said thermocouple junction,
   (c) tubular metallic means surrounding said first and second electrical leads and said sheath to a point substantially abreast of said thermocouple junction but spaced from said leads and said junction,
   (d) heat-resistant electrically-and-thermally-insulating means for rigidly maintaining the position of said junction substantially centered within and radially spaced from an end of said tubular metallic means substantially abreast thereof to prevent relative motion between said thermocouple junction and said tubular metallic means in an axial or radial direction thereof, and
   (e) means for causing said sheath and said thermocouple junction to make good thermal contact with said component without displacing said component on said circuit board.

8. Apparatus in accordance with claim 7, further including body means surrounding a portion of said tubular metallic means, and support means for said body means, said body means having one end which is flared outwardly from said tubular metallic means so as to allow relative motion of said tubular metallic means in a first direction transverse to said body means while confining said tubular metallic means against substantial relative motion with respect to said body means in a direction normal to said first direction, to form an aperture for through passage of said tubular metallic means, said tubular metallic means being supported in cantilever fashion within said body means and having elasticity sufficient to resist but to allow deflection of said tubular metallic means within said aperture.

9. Apparatus in accordance with claim 8 wherein the unstressed position of said tubular metallic means when passing through said aperture of said body is at one end of said aperture.

10. Apparatus in accordance with claim 9 in which the position of said tubular metallic means when said apparatus is exerting operating mechanical force on said device is at or near the center of said aperture.

11. Apparatus in accordance with claim 8 in which said support means for said body means includes clamping means for removably attaching said support means to a portion of a circuit board or circuit-board support on which said device may be positioned.

12. Apparatus in accordance with claim 8 in which said support means includes means for adjusting the position of said body means with respect thereto.

13. Apparatus in accordance with claim 8, further including connector means mounted on said body means for coupling said first and second electrical leads to external control, indicating, or display instrumentation.

14. A method for measuring the temperature of a device such as an electronic component supported on a surface such as a circuit board substantially without displacing the position of said device with respect to said surface either perpendicularly or parallel to said surface, comprising the steps of:
- (a) encasing a thermocouple junction in a protective covering,
- (b) surrounding said protective covering with a metallic shield that is spaced from said protective covering and fixed to prevent relative motion between said thermocouple junction and said metallic shield,
- (c) forming a sensor-tip assembly by providing an annular thermally-and-electrically-insulating spacer between said thermocouple junction and said metallic shield,
- (d) bringing said sensor-tip assembly into contact and maintaining it in good thermal contact with said device whose temperature is to be measured, and
- (e) reading the electrical output of said thermocouple junction while said good thermal contact is maintained.

15. A method in accordance with claim 14, including the additional step of displaying on or utilizing with a suitable instrument a representation of said electrical output of said thermocouple junction.

16. A method for measuring the temperature of a device such as an electronic component positioned on a supporting surface such as a circuit board substantially without altering the position of said device with respect to said supporting surface either perpendicularly or parallel to said supporting surface, comprising the steps of:
- (a) encasing a temperature sensor in a protective covering,
- (b) enclosing said protective covering, said temperature sensor, and the electrical leads of said temperature sensor in a metallic shield that is spaced from said protective covering and disposed to prevent relative motion between said metallic shield and said temperature sensor,
- (c) forming a sensor-tip assembly by providing a thermally-and-electrically-insulating seal between said temperature sensor and its protective covering and said metallic shield,
- (d) bringing said sensor-tip assembly into contact with and maintaining good thermal contact between it and said device whose temperature is to be measured, and
- (e) deriving from said electrical leads of said temperature sensor a signal expressive of the temperature of said device.

17. Probe apparatus for sensing the temperature of a device such as an electronic component positioned on a supporting surface such as a circuit board substantially without altering the position of said device with respect to said supporting surface in any relative direction therebetween, said probe apparatus comprising:
- (a) a thermocouple junction of dissimilar materials,
- (b) first and second electrical leads terminating at said thermocouple junction,
- (c) tubular metallic means surrounding said first and second electrical leads to a point substantially abreast of said thermocouple junction but spaced from said leads and said junction, said tubular metallic means being bent so as to have an outboard leg extending normal to said surface,
- (d) heat-resistant electrically-and-thermally-insulating means for rigidly maintaining the position of said junction substantially centered within and radially spaced from an end of said tubular metallic means substantially abreast thereof to prevent relative motion between said thermocouple junction and said tubular metallic means in an axial or a radial direction thereof, and
- (e) body means surrounding and supporting a portion of said tubular metallic means, said body means having one end which is flared outwardly from said tubular metallic means so as to allow relative motion of said tubular metallic means in a first direction transverse to said body means while confining said tubular metallic means against substantial relative motion with respect to said body means in a direction normal to said first direction, to form an aperture for through passage of said tubular metallic means, said tubular metallic means being supported in cantilever fashion within said body means and having elasticity sufficient to resist but to allow deflection of said tubular metallic means within said aperture.

* * * * *